A. BARKER,
Assignor to E. M. LANG.
Soldering Device.
No. 8,781. Reissued July 1, 1879.
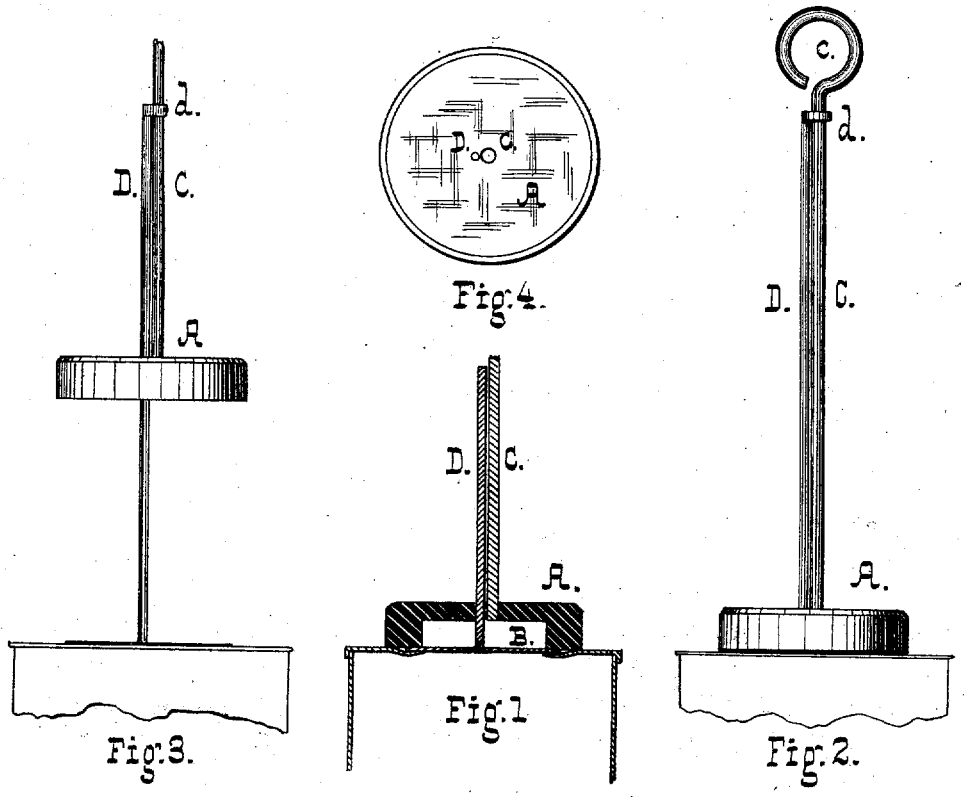
Witnesses,
W. A. Bertram.
Dr. L. H. Barclay.
Inventor
ABEL BARKER
by
R. W. Williams.
Attorney.
N. PETERS, PHOTO-LITHOGRAPHER, WASHINGTON, D. C.

UNITED STATES PATENT OFFICE.

ABEL BARKER, OF WYOMING, PA., ASSIGNOR TO EDWARD M. LANG.

IMPROVEMENT IN SOLDERING DEVICES.

Specification forming part of Letters Patent No. 103,125, dated May 17, 1870; Reissue No. 6,846, dated January 11, 1876; Reissue No. 8,781, dated July 1, 1879; application filed April 15, 1879.

*To all whom it may concern:*

Be it known that I, ABEL BARKER, of Wyoming, in the county of Luzerne and State of Pennsylvania, have invented certain new and useful Improvements in Soldering-Machines; and I hereby declare the same to be fully, clearly, and exactly described as follows, reference being had to the accompanying drawings, in which—

Figure 1 is a vertical central sectional view of the device; Fig. 2, a representation of the machine as applied to the can in opening; Fig. 3, as applied in closing or sealing, with the disk withdrawn and the sliding rod pressed upon the cover to hold it until the solder or sealing material hardens. Fig. 4 is a plan view of the disk.

The purpose of my invention is to provide a convenient machine or device for opening and sealing fruit, oyster, or other cans adapted to be hermetically sealed.

In constructing the machine I make the disk, casting, or tool A of sufficient thickness to retain the heat, and of suitable size to cover the lid or cap of the can, with the recess B in the under side to give room for the convex lid of the can, and to confine the soldering process to the outer edge of the lid or cover. To this disk I connect the handle C, which has a handle, *c*, for convenience in rotating the soldering-iron.

In connection with the handle I use the small rod or wire D, which passes through the soldering iron or disk A, so as to admit of the latter being rotated about or slid up and down upon the rod. The rod is connected to the handle C by a collar, *d*, embracing the latter.

In opening a can, the tool or iron A is sufficiently heated to melt the solder, when it is placed over the cover until the solder is completely melted, and the cap is then removed by any sharp-pointed instrument.

In closing or sealing a can, the cover or cap is to be placed in proper position upon the can and solder is laid upon the edge of the cover. The rod D is pushed down through the tool and placed upon the cover to hold it. The heated disk or iron is then pushed down in contact with the solder or sealing material until it is melted, and then turned back and forth until the solder is spread evenly around the edge of the cover. The disk is then to be withdrawn with the rod still pressed upon the lid until the solder or sealing material sets or hardens, when the operation is completed.

Having thus described my invention, what I claim as new, and desire to secure by Letters Patent, is—

1. In a soldering-machine, a rod adapted to hold the can cap or lid in place, in combination with a soldering-iron mounted upon and arranged to be rotated about said rod, substantially as described.

2. In a soldering-machine, a rod adapted to hold the can cap or lid in place, in combination with a soldering-iron sliding upon said rod and adapted to be rotated about it, as set forth.

3. In combination with a soldering tool or die, the rod D, passing through said tool or die to hold the can cap or lid in the process of soldering, substantially as described.

4. In a soldering-machine, the combination, with a soldering-tool conforming in shape to the cap to be soldered, of an independently-movable rod, D, upon which the said tool is mounted, substantially as described.

5. The disk or tool A, with the recess B in its under side, in combination with and mounted upon the independently-movable rod or wire D, as set forth.

ABEL BARKER.

Witnesses:
G. M. RICHART,
JAS. L. POLEN.